United States Patent Office.

IRA PAGE, OF ADAMS, NEW YORK.

Letters Patent No. 79,078, dated June 23, 1868.

IMPROVEMENT IN MANUFACTURING BUTTER FROM WHEY.

*The Schedule referred to in these Letters Patent and making part of the same.*

TO ALL WHOM IT MAY CONCERN:

Be it known that I, IRA PAGE, of Adams, in the county of Jefferson, and State of New York, have invented a new and useful Improvement in the Manufacture of Butter from Whey; and I do hereby declare that the following is a full, clear, and exact description thereof, which will enable others skilled in the art to make and use the same.

This invention relates to a new and improved mode of manufacturing butter from whey; and the invention consists in, first, setting the whey in clear and clean vessels or vats, where, having allowed it to remain for twenty-four (24) hours, skim or take off the cream; second, then add to the cream, for ten (10) pounds of butter, one (1) ounce of saltpetre, first dissolved and filtered, and, having mixed it thoroughly with the cream, churn immediately.

The saltpetre dissolves the membranous coverings of the atoms of cream, and also acts as a preservative.

Butter having thus been produced, wash it in cold water, and then work it thoroughly, after which add one (1) pound of salt, and one-quarter ($\frac{1}{4}$) pound of white sugar, ground fine, and again work it thoroughly, when it is fit for use, or for being packed.

The solution of nitre is mixed with the cream before churning, in order to purify the cream from the cheesy taste and quality derived from the use of rennet in the milk.

Having thus described my invention, what I claim as new, and desire to secure by Letters Patent, is—

The improved mode of manufacturing butter from whey, substantially as and for the purpose described.

IRA PAGE.

Witnesses:
  G. W. BOND,
  GEO. A. FOX.